(12) United States Patent
Tang

(10) Patent No.: US 7,762,850 B2
(45) Date of Patent: Jul. 27, 2010

(54) SURFACE CONTACT CARD RETENTION ASSEMBLY

(75) Inventor: Zi-Ming Tang, Shenzhen (CN)

(73) Assignees: Hong Fu Jin Precision Industry (ShenZhen) Co., Ltd., Shenzhen, Gunagdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/341,382

(22) Filed: Dec. 22, 2008

(65) Prior Publication Data
US 2010/0041264 A1  Feb. 18, 2010

(30) Foreign Application Priority Data
Aug. 15, 2008  (CN)  .................. 2008 1 0303864

(51) Int. Cl.
*H01R 24/00*  (2006.01)

(52) U.S. Cl. .................................................... 439/630
(58) Field of Classification Search ................. 439/630, 439/331, 330
See application file for complete search history.

(56) References Cited

U.S. PATENT DOCUMENTS 6,561,431 B2 *  5/2003  Roussy et al. ............... 235/492
6,831,977 B2 * 12/2004  Kiernan et al. ......... 379/433.09

* cited by examiner

*Primary Examiner*—Phuong K Dinh
(74) *Attorney, Agent, or Firm*—Clifford O. Chi

(57) ABSTRACT

A retention assembly for securing a surface contact card in a portable electronic device includes a main body, a receiving groove defined in the main body, and a locking member rotatably positioned on the main body adjacent to the receiving groove. The locking member can be rotated from a first position at a side of the receiving groove to a second position on top of the receiving groove.

15 Claims, 5 Drawing Sheets

SURFACE CONTACT CARD RETENTION ASSEMBLY

BACKGROUND

1. Technical Field

The present disclosure generally relates to retention assemblies for securing a surface contact card, such as a subscriber identification module card, to a portable electronic device.

2. Description of Related Art

Surface contact cards, such as subscriber identity module cards (SIM), compact flash cards, and multimedia cards having special circuits, are widely used in portable electronic devices, such as mobile telephones, to enhance or specialize the functions of the portable electronic devices. For example, a SIM card is placed in a mobile phone to dedicate the mobile phone's functions to the SIM card owner.

Referring to FIG. 5, a typical retention assembly (not labeled) for securing a SIM card (not shown) in a mobile telephone includes a base plate 72, and a locking member 74. The base plate 72 defines a receiving groove 721, and includes a connector 70 positioned on a bottom surface of the receiving groove 721. A shape and size of the receiving groove 721 matches the SIM card, so that the SIM card can be received in the receiving groove 721 and electronically connected to the connector 70. The locking member 74 is positioned on the base plate 72 adjacent to the receiving groove 721 and can be moved back and forth along the direction as indicated by the arrow shown in FIG. 5.

When the locking member 74 is moved away from the receiving groove 721, the SIM card may be received in the receiving groove 721. The locking member 74 may be moved adjacent to the receiving groove 721 to lock the SIM card in the receiving groove 721. The SIM card may be released by moving the locking member 74 away from the receiving groove 721.

However, in the typical retention assembly, the locking member 74 can be easily moved. For example, if the mobile telephone drops to the ground, a shock may force the locking member 74 to move away from the receiving groove 72. As a result, the SIM card will not be sufficiently connected with the contactor 70 or released from the receiving groove 721. Therefore, such a retention assembly can not adequately maintain the SIM card in the receiving groove 721.

Therefore, a retention assembly which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

The present retention assembly may be used for securing a surface contact card in a portable electronic device. Hereinafter, for the purposes of conveniently describing the embodiments of the retention assembly, the retention assembly as used for securing a SIM card in a mobile phone is described and illustrated.

Figure 1:
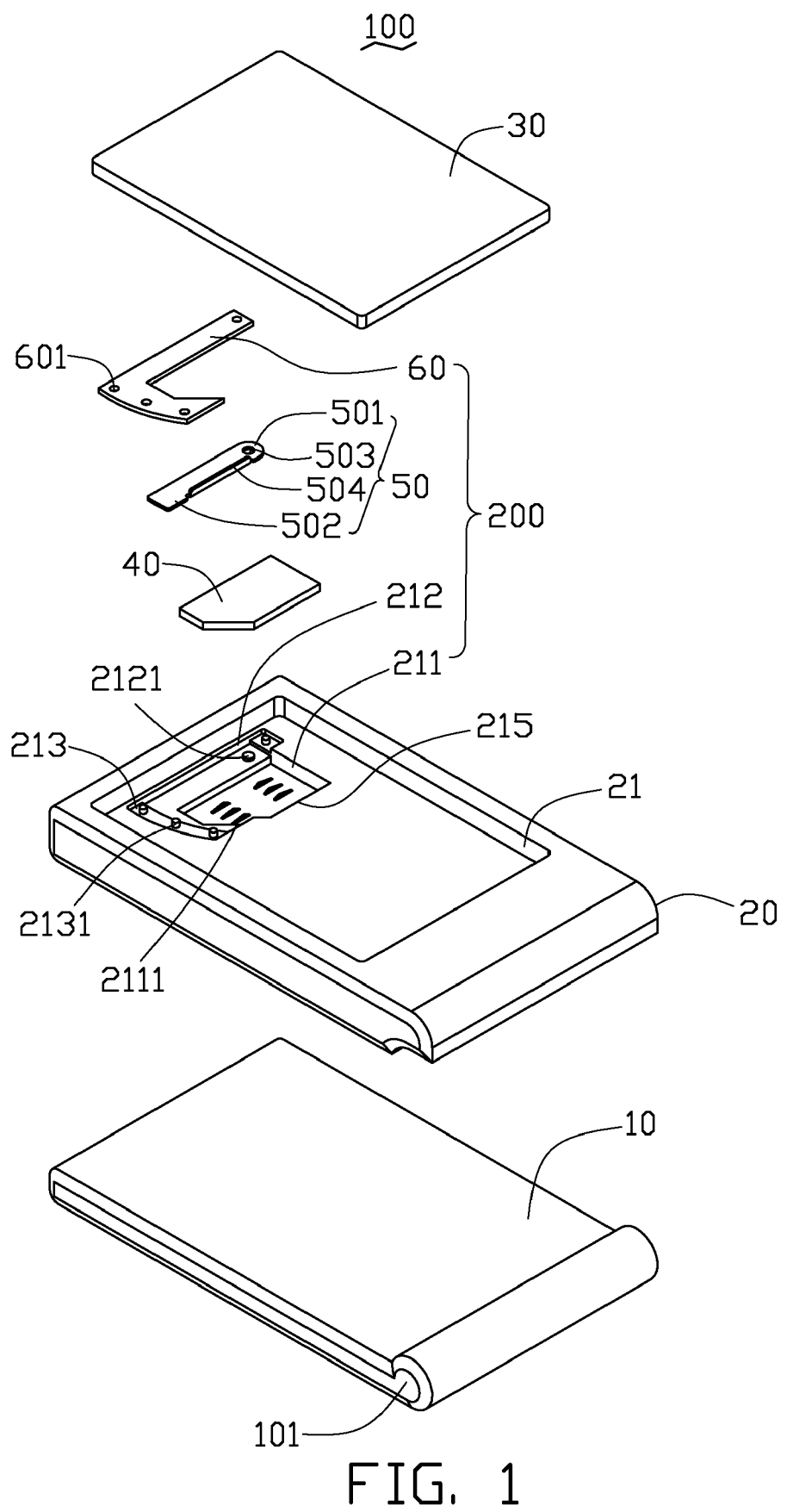
FIG. 1 is a partial, exploded, isometric view of an embodiment of a mobile phone including a retention assembly.

Referring to FIG. 1, a mobile phone 100 includes a first main body 10, a second main body 20, a battery 30, a SIM card 40, and an embodiment of a retention assembly 200. The second main body 20 is pivotally connected to the first main body 10 via a hinge 101. A battery groove 21 is defined in the second main body 20, to receive the battery 30. The SIM card 40 is secured in the battery groove 21 by the retention assembly 200.

The retention assembly 200 includes a receiving groove 211, a mounting groove 212, a locking member 50, and a retaining plate 60. The receiving groove 211 and the mounting groove 212 are both defined in a bottom surface of the battery groove 21, and the mounting groove 212 is adjacent to the receiving groove 211.

A plurality of contacts 2111 are positioned on the bottom surface of the receiving groove 211. In the illustrated embodiment, the contacts 2111 are metallic elastic pieces. A shape of the receiving groove 211 has a same shape as the SIM card 40, so that the SIM card 40 can be received in the receiving groove 211 and electrically connected to the contacts 2111. A depth of the receiving groove 211 is slightly larger than a thickness of the SIM card 40. In one embodiment, a side surface 215 of the receiving groove 211 is an oblique surface to facilitate assembling or disassembling the SIM card 40.

The mounting groove 212 is substantially L-shaped. A depth of the mounting groove 212 is less than the depth of the receiving groove 211, and a depth difference between the mounting groove 212 and the receiving groove 211 is larger than or equal to the thickness of the SIM card 40. Therefore, the SIM card 40 can be received in the receiving groove 211 and under the bottom surface of the mounting groove 212. A protrusion 2121 is formed on a bottom surface of the mounting groove 212. In the illustrated embodiment, the protrusion 2121 is substantially cylindrical shaped. Two stepped portions 213 are formed on the bottom surface on opposite ends of the mounting groove 212. A plurality of positioning pins 2131 protrude from the stepped portions 213.

The locking member 50 is substantially an elongated sheet, and has a fixing end 501 and a free end 502. The fixing end 501 defines a circular hole 503 in a center portion corresponding to the protrusion 2121 of the mounting groove 212. A rib 504 extends substantially perpendicularly from a side of the locking member 50 to facilitate operation of the locking member 50. A height of the rib 504 is less than or equal to the depth of the mounting groove 212.

The retaining plate 60 has substantially the same shape as the mounting groove 212. A plurality of positioning holes 601 is defined in the retaining plate 60 corresponding to the positioning pins 2131 of the mounting groove 212.

Figure 2:
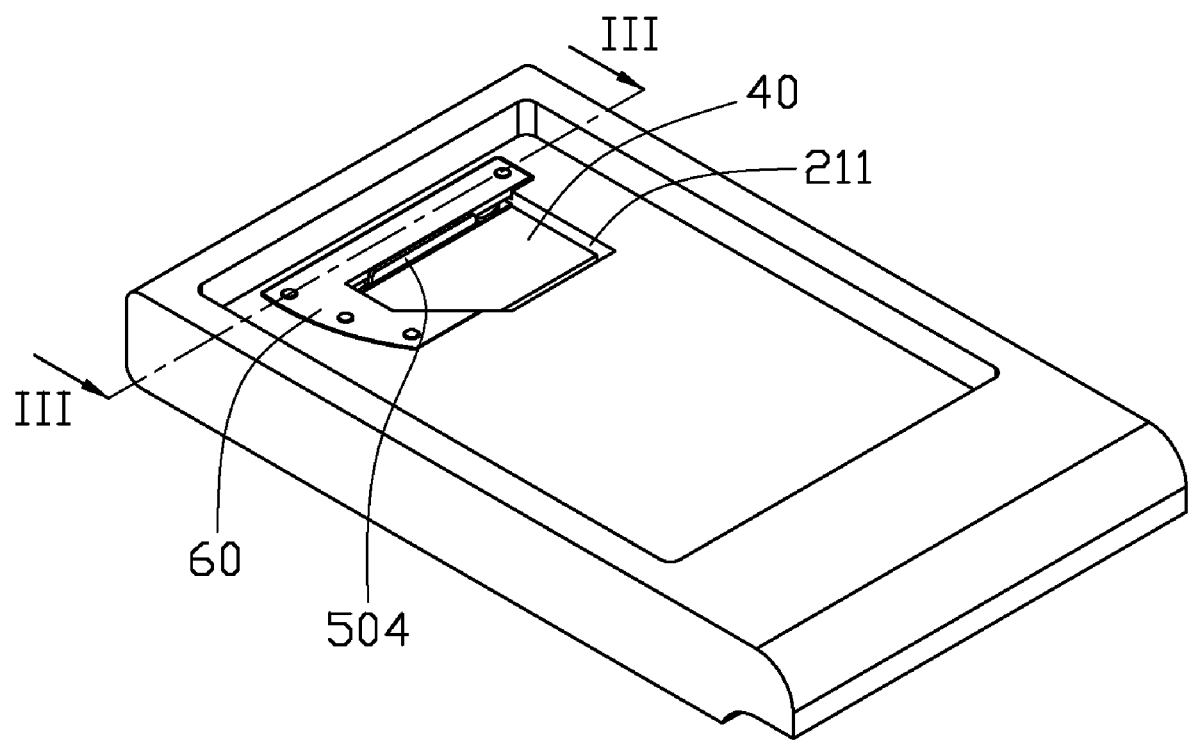
FIG. 2 is a partial, assembled, isometric view of the mobile phone in FIG. 1.
Figure 3:
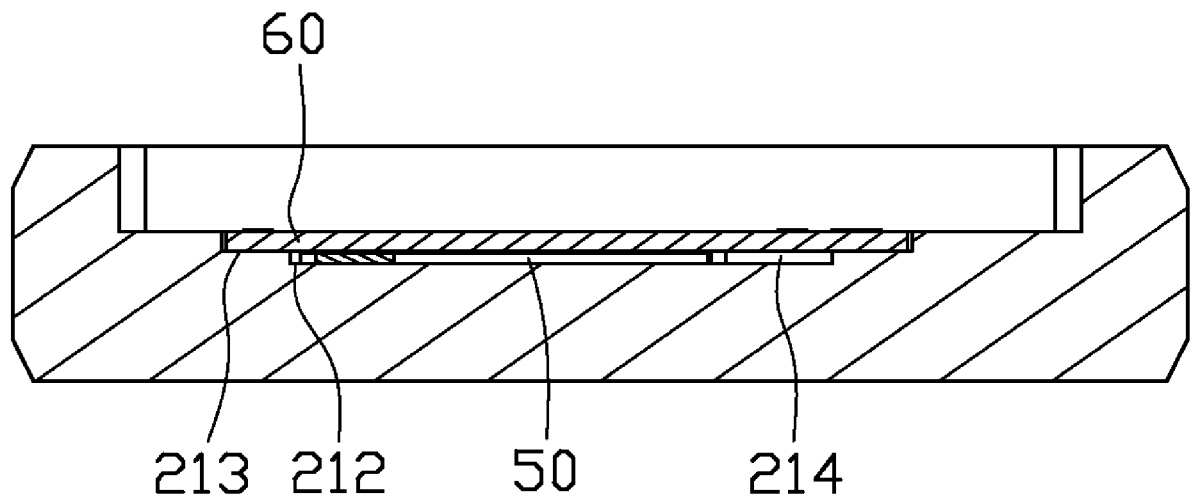
FIG. 3 is a cross-sectional view of the mobile phone of FIG. 1 taken along line III-III in FIG. 2.

Referring also to FIG. 2, the protrusion 2121 of the mounting groove 212 is inserted into the circular hole 503 of the locking member 50, so that the locking member 50 is rotatable around the protrusion 2121. The retaining plate 60 is positioned into the mounting groove 212, and the positioning pins 2131 engage in the positioning holes 601, thereby holding the locking member 50 in a gap 214 (shown in FIG. 3) between the retaining plate 60 and the bottom surface of the mounting groove 212. The rib 504 of the locking member 50 is exposed to the mounting groove 212.

Figure 4:
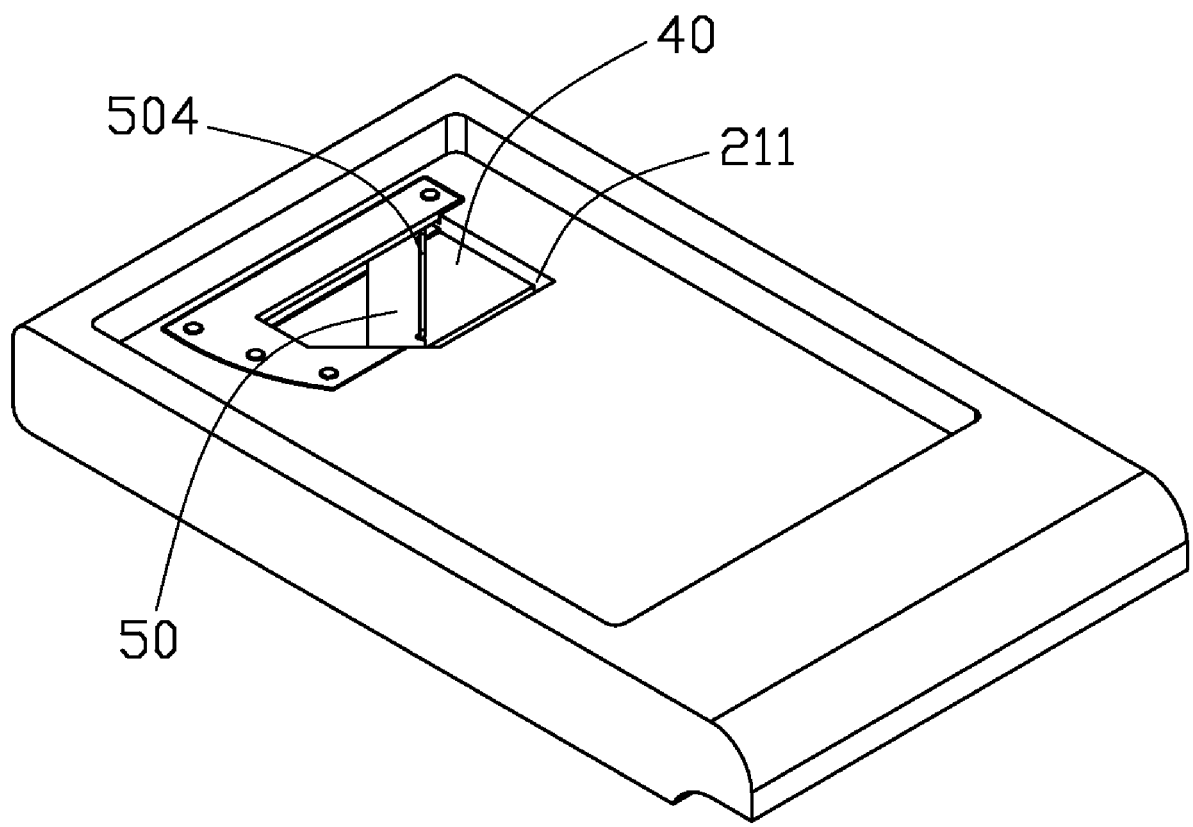
FIG. 4 is a partial, assembled, isometric view of the mobile phone in FIG. 1, showing a SIM card secured in the mobile phone.
Figure 5:
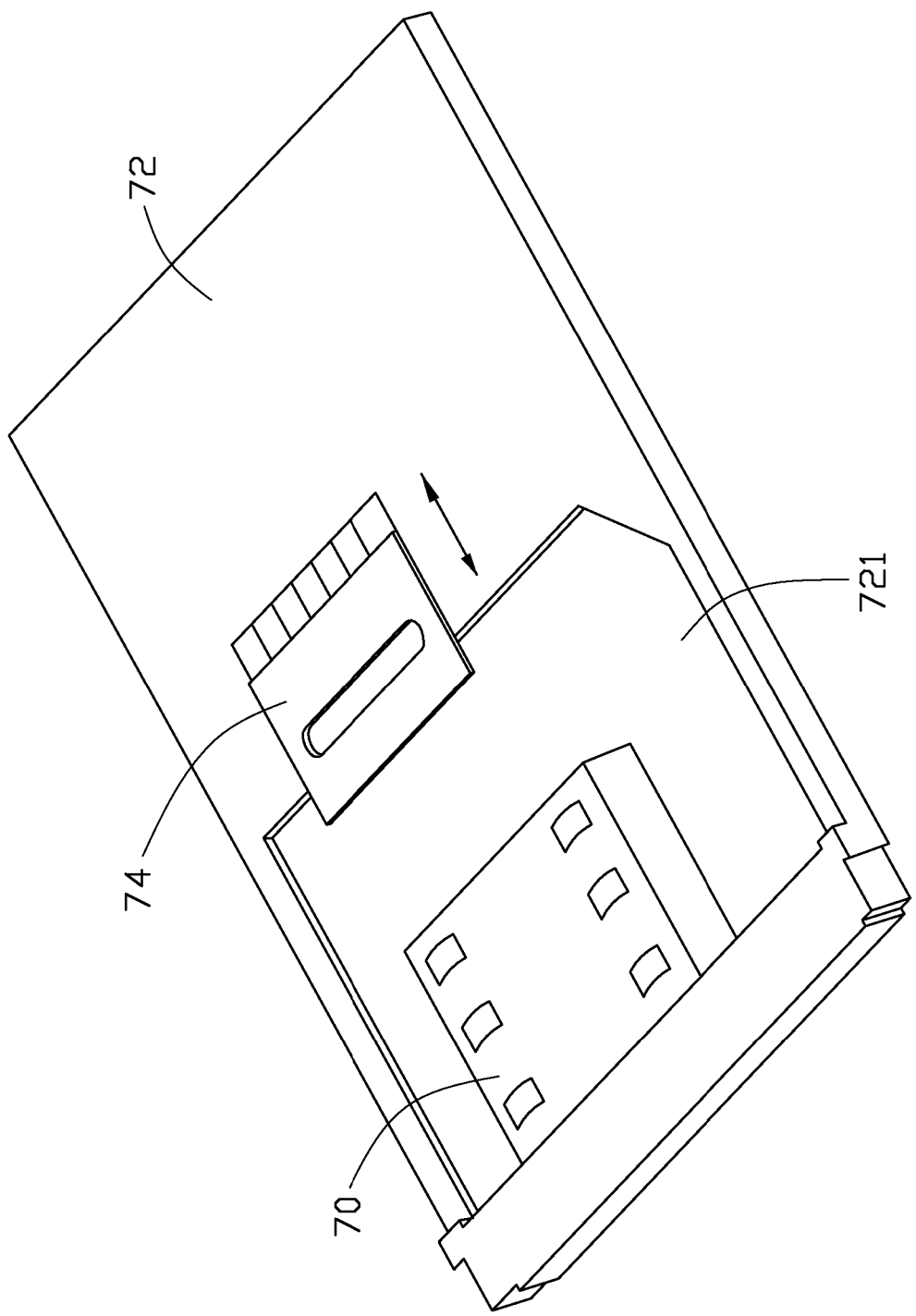
FIG. 5 is an assembled, isometric view of a typical retention assembly.

The SIM card 40 is positioned in the receiving groove 211, the rib 504 is pulled so that the locking member 50 is rotated around the protrusion 2121, and the free end 502 is moved from a first position at a side of the receiving groove 211 to a second position on top of the receiving groove 211, so that the locking member 50 is rotated to lie atop of the SIM card 40 (shown in FIG. 4). The SIM card 40 is secured in the receiving groove 211 via a force created by the locking member 50 and the elastic force created by the contacts 2111. Since opposite ends along a diagonal of the SIM card 40 are pressed by the locking member 50, the SIM card 40 is reliably secured in the receiving groove 211 and has a good shock resistance capability.

The SIM card 40 can be easily taken out of the receiving groove 211 by pushing the locking member 50 into the gap 214, so that the SIM card 40 is partially pushed out of the receiving groove 211 by the elastic force created by the contacts 2111.

In alternative embodiments, the protrusion 2121 may be positioned on the bottom surface of the battery groove 21, adjacent to a corner of the receiving groove 211. The protrusion 2121 may have a latching portion, such as a latching groove or a latching ring defined around the protrusion 2121 to rotatably latch with the locking member 50. Thus, the mounting groove 212, the stepped portions 213, the positioning pins 2131, and the retaining plate 60 may all be omitted.

It is believed that the present embodiments and their advantages will be understood from the foregoing description, and it will be apparent that various changes may be made thereto without departing from the spirit and scope of the embodiments or sacrificing all of its material advantages, the examples hereinbefore described merely being preferred or exemplary embodiments.

What is claimed is:

1. A retention assembly for securing a surface contact card in a portable electronic device, comprising:
   a main body defining a receiving groove and a battery groove therein, wherein the receiving groove is defined in a bottom surface of the battery groove, and the bottom surface of the battery groove further defines a mounting groove adjacent to the receiving groove; and
   a locking member rotatably positioned on the main body adjacent to the receiving groove and rotatably positioned in the mounting groove, the locking member being rotatable from a first position at a side of the receiving groove to a second position on a top of the receiving groove;
   wherein a bottom surface of the mounting groove defines a protrusion thereon, the locking member defines a circular hole therein, and the protrusion is inserted into the circular hole.

2. The retention assembly of claim 1, wherein a depth of the mounting groove is less than a depth of the receiving groove, and a difference in depth between the mounting groove and the receiving groove is larger than or equal to a thickness of the card.

3. The retention assembly of claim 1, wherein the locking member comprises a rib extending substantially perpendicularly from a side of the locking member.

4. The retention assembly of claim 1, wherein a side surface of the receiving groove is an oblique surface.

5. A retention assembly for securing a surface contact card in a portable electronic device, comprising:
   a main body defining a receiving groove and a mounting groove adjacent to the receiving groove;
   a locking member having a fixing end rotatably positioned on a bottom surface of the mounting groove, and a free end being rotatable from a first position at a side of the receiving groove to a second position on top of the receiving groove; and
   a retaining plate fixed in the mounting groove on top of the locking member, to retain the locking member in the mounting groove.

6. The retention assembly of claim 5, wherein a bottom surface of the mounting groove defines a protrusion thereon, the locking member defines a circular hole in the fixing end, and the protrusion is inserted into the circular hole.

7. The retention assembly of claim 5, wherein a bottom surface of the mounting groove defines a stepped portion thereon and adjacent to an end of the mounting groove, the stepped portion defines a plurality of positioning pins thereon; the retaining plate defines a plurality of positioning holes therein, the plurality of positioning pins engages in the plurality of the positioning holes.

8. The retention assembly of claim 5, wherein the retaining plate and the bottom surface of the mounting groove cooperatively define a gap, the locking member is held in the gap.

9. The retention assembly of claim 5, wherein a depth of the mounting groove is less than a depth of the receiving groove, and a difference in depth between the mounting groove and the receiving groove is larger than or equal to a thickness of the card.

10. The retention assembly of claim 5, wherein the locking member comprises a rib extending substantially perpendicularly from a side of the locking member.

11. The retention assembly of claim 10, wherein a height of the rib is less than or equal to a depth of the mounting groove.

12. A retention assembly for securing a surface contact card in a portable electronic device, comprising:
   a main body defining a receiving groove and a battery groove therein, wherein the receiving groove is defined in a bottom surface of the battery groove, and the bottom surface of the battery groove further defines a mounting groove adjacent to the receiving groove; and
   a locking member rotatably positioned on the main body adjacent to the receiving groove and rotatably positioned in the mounting groove, the locking member being rotatable from a first position at a side of the receiving groove to a second position on a top of the receiving groove;
   wherein the mounting groove includes a stepped portion formed on a bottom surface and adjacent to an end of the mounting groove, the stepped portion defines a plurality of positioning pins thereon; the retention assembly further comprises a retaining plate, the retaining plate defines a plurality of positioning holes therein, the plurality of positioning pins engages in the plurality of the positioning holes.

13. The retention assembly of claim 12, wherein a depth of the mounting groove is less than a depth of the receiving groove, and a difference in depth between the mounting groove and the receiving groove is larger than or equal to a thickness of the card.

14. The retention assembly of claim 12, wherein the locking member comprises a rib extending substantially perpendicularly from a side of the locking member.

15. The retention assembly of claim 12, wherein a side surface of the receiving groove is an oblique surface.

* * * * *